(12) United States Patent
Tseng et al.

(10) Patent No.: US 10,369,988 B2
(45) Date of Patent: Aug. 6, 2019

(54) AUTONOMOUS PARKING OF VEHICLES INPERPENDICULAR PARKING SPOTS

(71) Applicant: Ford Global Technologies, LLC, Dearborn, MI (US)

(72) Inventors: Eric Hongtei Tseng, Canton, MI (US); Li Xu, Northville, MI (US); Kyle Simmons, New Boston, MI (US); Douglas Blue, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/406,370

(22) Filed: Jan. 13, 2017

(65) Prior Publication Data

US 2018/0201256 A1    Jul. 19, 2018

(51) Int. Cl.
| | |
|---|---|
| *B60W 30/06* | (2006.01) |
| *B60W 10/04* | (2006.01) |
| *B60W 10/184* | (2012.01) |
| *B60W 10/20* | (2006.01) |
| *B62D 15/02* | (2006.01) |

(Continued)

(52) U.S. Cl.
CPC ............ *B60W 30/06* (2013.01); *B60W 10/04* (2013.01); *B60W 10/184* (2013.01); *B60W 10/20* (2013.01); *B62D 15/0285* (2013.01); *G05D 1/0055* (2013.01); *G05D 1/0212* (2013.01); *B60W 2420/42* (2013.01); *B60W 2420/52* (2013.01); *B60W 2420/54* (2013.01); *B60W 2520/14* (2013.01); *B60W 2520/16* (2013.01); *B60W 2520/28* (2013.01); *B60W 2550/14* (2013.01); *B60W 2600/00* (2013.01); *G05D 2201/0213* (2013.01)

(58) Field of Classification Search
CPC ........................... B60W 30/06; B62D 15/0285
See application file for complete search history.

(56) References Cited

U.S. PATENT DOCUMENTS

| | | |
|---|---|---|
| 6,356,828 B1 | 3/2002 | Shimizu |
| 6,476,730 B2 | 11/2002 | Kakinami |

(Continued)

FOREIGN PATENT DOCUMENTS

| | | |
|---|---|---|
| CN | 106945662 A | 7/1917 |
| CN | 101929921 A | 12/2010 |

(Continued)

OTHER PUBLICATIONS

US 9,772,406 B2, 09/2017, Liu (withdrawn)

(Continued)

*Primary Examiner* — Todd M Melton
(74) *Attorney, Agent, or Firm* — Frank Lollo; Neal, Gerber & Eisenberg LLP; James P. Muraff (57) ABSTRACT

Method and apparatus are disclosed for autonomous parking of vehicles in perpendicular parking spots. An example vehicle includes a front corner, a camera, and an autonomous vehicle parker. The autonomous vehicle parker is to detect, via the camera, a perpendicular parking spot and an outer boundary of the perpendicular parking spot, determine a linear parking path located within the perpendicular parking spot and based on the outer boundary, and autonomously turn into the perpendicular parking spot such that the front corner travels along the linear parking path.

20 Claims, 6 Drawing Sheets

(51) Int. Cl.
*G05D 1/00* (2006.01)
*G05D 1/02* (2006.01)

(56) References Cited

U.S. PATENT DOCUMENTS

| | | | |
|---|---|---|---|
| 6,657,555 B2 | 12/2003 | Shimizu |
| 6,683,539 B2 | 1/2004 | Trajkovic |
| 6,724,322 B2 | 4/2004 | Tang |
| 6,744,364 B2 | 6/2004 | Wathen |
| 6,768,420 B2 | 7/2004 | McCarthy |
| 6,801,855 B1 | 10/2004 | Walters |
| 6,850,148 B2 | 2/2005 | Masudaya |
| 6,927,685 B2 | 8/2005 | Wathen |
| 6,850,844 B1 | 10/2005 | Walters |
| 7,042,332 B2 | 5/2006 | Takamura |
| 7,123,167 B2 | 10/2006 | Staniszewski |
| 7,663,508 B2 | 2/2010 | Teshima |
| 7,737,866 B2 | 6/2010 | Wu |
| 7,813,844 B2 | 10/2010 | Gensler |
| 7,825,828 B2 | 11/2010 | Watanabe |
| 7,834,778 B2 | 11/2010 | Browne |
| 7,847,709 B2 | 12/2010 | McCall |
| 7,850,078 B2 | 12/2010 | Christenson |
| 8,035,503 B2 | 10/2011 | Partin |
| 8,054,169 B2 | 11/2011 | Bettecken |
| 8,126,450 B2 | 2/2012 | Howarter |
| 8,164,628 B2 | 4/2012 | Stein |
| 8,180,524 B2 | 5/2012 | Eguchi |
| 8,180,547 B2 | 5/2012 | Prasad |
| 8,224,313 B2 | 7/2012 | Howarter |
| 8,229,645 B2 | 7/2012 | Lee |
| 8,242,884 B2 | 8/2012 | Holcomb |
| 8,335,598 B2 | 12/2012 | Dickerhoof |
| 8,401,235 B2 | 3/2013 | Lee |
| 8,493,236 B2 | 7/2013 | Boehme |
| 8,538,408 B2 | 9/2013 | Howarter |
| 8,542,130 B2 | 9/2013 | Lavoie |
| 8,587,681 B2 | 11/2013 | Guidash |
| 8,594,616 B2 | 11/2013 | Gusikhin |
| 8,599,043 B2 | 12/2013 | Kadowaki |
| 8,645,015 B2 * | 2/2014 | Oetiker ................. B60W 10/20 340/425.5 |
| 8,655,551 B2 | 2/2014 | Danz |
| 8,692,773 B2 | 4/2014 | You |
| 8,706,350 B2 | 4/2014 | Talty |
| 8,725,315 B2 | 5/2014 | Talty |
| 8,742,947 B2 | 6/2014 | Nakazono |
| 8,744,684 B2 | 6/2014 | Hong |
| 8,780,257 B2 | 7/2014 | Gidon |
| 8,825,262 B2 | 9/2014 | Lee |
| 8,933,778 B2 | 1/2015 | Birkel |
| 8,957,786 B2 | 2/2015 | Stempnik |
| 8,994,548 B2 | 3/2015 | Gaboury |
| 8,995,914 B2 | 3/2015 | Nishidai |
| 9,008,860 B2 | 4/2015 | Waldock |
| 9,014,920 B1 | 4/2015 | Torres |
| 9,078,200 B2 | 7/2015 | Wuergler |
| 9,086,879 B2 | 7/2015 | Gautama |
| 9,141,503 B1 | 9/2015 | Chen |
| 9,147,065 B2 | 9/2015 | Lauer |
| 9,154,920 B2 | 10/2015 | O'Brien |
| 9,168,955 B2 | 10/2015 | Noh |
| 9,193,387 B2 * | 11/2015 | Auer ................. B62D 15/0265 |
| 9,225,531 B2 | 12/2015 | Hachey |
| 9,233,710 B2 | 1/2016 | Lavoie |
| 9,273,966 B2 | 3/2016 | Bartels |
| 9,283,960 B1 | 3/2016 | Lavoie |
| 9,286,803 B2 | 3/2016 | Tippelhofer |
| 9,302,675 B2 | 4/2016 | Schilling |
| 9,318,022 B2 | 4/2016 | Barth |
| 9,379,567 B2 | 6/2016 | Kracker |
| 9,381,859 B2 | 7/2016 | Nagata |
| 9,429,657 B2 | 8/2016 | Sidhu |
| 9,429,947 B1 | 8/2016 | Wengreen |
| 9,469,247 B2 | 10/2016 | Juneja |
| 9,493,187 B2 | 11/2016 | Pilutti |
| 9,506,774 B2 | 11/2016 | Shutko |
| 9,522,675 B1 | 12/2016 | You |
| 9,529,519 B2 | 12/2016 | Blumenberg |
| 9,557,741 B1 | 1/2017 | Elie |
| 9,563,990 B2 | 2/2017 | Khan |
| 9,595,145 B2 | 3/2017 | Avery |
| 9,598,051 B2 | 3/2017 | Okada |
| 9,606,241 B2 | 3/2017 | Varoglu |
| 9,616,923 B2 | 4/2017 | Lavoie |
| 9,637,117 B1 | 5/2017 | Gusikhin |
| 9,651,655 B2 | 5/2017 | Feldman |
| 9,656,690 B2 | 5/2017 | Shen |
| 9,666,040 B2 | 5/2017 | Flaherty |
| 9,688,306 B2 | 6/2017 | McClain |
| 9,701,280 B2 | 7/2017 | Schussmann |
| 9,712,977 B2 | 7/2017 | Tu |
| 9,715,816 B1 | 7/2017 | Adler |
| 9,725,069 B2 | 8/2017 | Krishnan |
| 9,731,714 B2 | 8/2017 | Kiriya |
| 9,731,764 B2 * | 8/2017 | Baek ................. B62D 15/0285 |
| 9,754,173 B2 | 9/2017 | Kim |
| 9,809,218 B2 | 11/2017 | Elie |
| 9,842,444 B2 | 12/2017 | Van Wiemeersch |
| 9,845,070 B2 | 12/2017 | Petel |
| 9,846,431 B2 | 12/2017 | Petel |
| 9,914,333 B2 | 3/2018 | Shank |
| 9,921,743 B2 | 3/2018 | Bryant |
| 9,946,255 B2 | 4/2018 | Matters |
| 9,959,763 B2 | 5/2018 | Miller |
| 9,975,504 B2 | 5/2018 | Dalke |
| 10,131,347 B2 | 11/2018 | Kim |
| 2003/0060972 A1 | 3/2003 | Kakinami |
| 2003/0098792 A1 | 5/2003 | Edwards |
| 2005/0030156 A1 | 2/2005 | Alfonso |
| 2005/0099275 A1 | 5/2005 | Kamdar |
| 2006/0227010 A1 | 10/2006 | Berstis |
| 2006/0235590 A1 | 10/2006 | Bolourchi |
| 2007/0230944 A1 | 10/2007 | Georgiev |
| 2008/0027591 A1 | 1/2008 | Lenser |
| 2008/0154464 A1 | 6/2008 | Sasajima |
| 2008/0154613 A1 | 6/2008 | Haulick |
| 2008/0238643 A1 | 10/2008 | Malen |
| 2008/0306683 A1 | 12/2008 | Ando |
| 2009/0096753 A1 | 4/2009 | Lim |
| 2009/0098907 A1 | 4/2009 | Huntzicker |
| 2009/0115639 A1 | 5/2009 | Proefke |
| 2009/0125181 A1 | 5/2009 | Luke |
| 2009/0125311 A1 | 5/2009 | Haulick |
| 2009/0128315 A1 | 5/2009 | Griesser |
| 2009/0146813 A1 | 6/2009 | Nuno |
| 2009/0289813 A1 | 11/2009 | Kwiecinski |
| 2009/0313095 A1 | 12/2009 | Hurpin |
| 2010/0025942 A1 | 2/2010 | Von Rehyer |
| 2010/0114471 A1 | 5/2010 | Sugiyama |
| 2010/0114488 A1 | 5/2010 | Khamharn |
| 2010/0152972 A1 | 6/2010 | Attard |
| 2010/0156672 A1 | 6/2010 | Yoo |
| 2010/0259420 A1 | 10/2010 | Von Reyher |
| 2011/0071725 A1 | 3/2011 | Kleve |
| 2011/0082613 A1 | 4/2011 | Oetiker |
| 2012/0007741 A1 | 1/2012 | Laffey |
| 2012/0072067 A1 | 3/2012 | Jecker |
| 2012/0083960 A1 | 4/2012 | Zhu |
| 2012/0173080 A1 | 7/2012 | Cluff |
| 2012/0303258 A1 | 11/2012 | Pampus |
| 2012/0323643 A1 | 12/2012 | Volz |
| 2012/0323700 A1 | 12/2012 | Aleksandrovich |
| 2013/0021171 A1 | 1/2013 | Hsu |
| 2013/0024202 A1 | 1/2013 | Harris |
| 2013/0073119 A1 | 3/2013 | Huger |
| 2013/0110342 A1 | 5/2013 | Wuttke |
| 2013/0113936 A1 | 5/2013 | Cohen |
| 2013/0124061 A1 | 5/2013 | Khanafer |
| 2013/0145441 A1 | 6/2013 | Mujumdar |
| 2013/0231824 A1 | 9/2013 | Wilson |
| 2013/0289825 A1 | 10/2013 | Noh |
| 2013/0314502 A1 | 11/2013 | Urbach |
| 2013/0317944 A1 | 11/2013 | Huang |

(56) References Cited

U.S. PATENT DOCUMENTS

| | | |
|---|---|---|
| 2014/0096051 A1 | 4/2014 | Boblett |
| 2014/0121930 A1 | 5/2014 | Allexi |
| 2014/0147032 A1 | 5/2014 | Yous |
| 2014/0188339 A1 | 7/2014 | Moon |
| 2014/0222252 A1 | 8/2014 | Matters |
| 2014/0240502 A1 | 8/2014 | Strauss |
| 2014/0300504 A1 | 10/2014 | Shaffer |
| 2014/0303839 A1 | 10/2014 | Filev |
| 2014/0320318 A1 | 10/2014 | Victor |
| 2014/0327736 A1 | 11/2014 | DeJohn |
| 2014/0350804 A1 | 11/2014 | Park |
| 2014/0350855 A1 | 11/2014 | Vishnuvajhala |
| 2014/0365108 A1* | 12/2014 | You .................. B62D 15/0285 701/408 |
| 2014/0365126 A1 | 12/2014 | Vulcano |
| 2015/0022468 A1 | 1/2015 | Cha |
| 2015/0039173 A1 | 2/2015 | Beaurepaire |
| 2015/0039224 A1 | 2/2015 | Tuukkanen |
| 2015/0066545 A1 | 3/2015 | Kotecha |
| 2015/0077522 A1 | 3/2015 | Suzuki |
| 2015/0088360 A1 | 3/2015 | Bonnet |
| 2015/0091741 A1 | 4/2015 | Stefik |
| 2015/0123818 A1 | 5/2015 | Sellschopp |
| 2015/0127208 A1 | 5/2015 | Jecker |
| 2015/0149265 A1 | 5/2015 | Huntzicker |
| 2015/0151789 A1 | 6/2015 | Lee et al. |
| 2015/0153178 A1 | 6/2015 | Koo |
| 2015/0161890 A1 | 6/2015 | Huntzicker |
| 2015/0163649 A1 | 6/2015 | Chen |
| 2015/0203111 A1 | 7/2015 | Bonnet |
| 2015/0219464 A1 | 8/2015 | Beaurepaire |
| 2015/0220791 A1 | 8/2015 | Wu |
| 2015/0226146 A1 | 8/2015 | Elwart |
| 2015/0274016 A1 | 10/2015 | Kinoshita |
| 2015/0286340 A1 | 10/2015 | Send |
| 2015/0329110 A1 | 11/2015 | Stefan |
| 2015/0344028 A1 | 12/2015 | Gieseke |
| 2015/0346727 A1 | 12/2015 | Ramanujam |
| 2015/0360720 A1 | 12/2015 | Li |
| 2015/0371541 A1 | 12/2015 | Korman |
| 2015/0375741 A1 | 12/2015 | Kiriya |
| 2015/0375742 A1 | 12/2015 | Gebert et al. |
| 2016/0012726 A1 | 1/2016 | Wang |
| 2016/0055749 A1 | 2/2016 | Nicoll |
| 2016/0062354 A1 | 3/2016 | Li |
| 2016/0068187 A1 | 3/2016 | Hata |
| 2016/0075369 A1 | 3/2016 | Lavoie |
| 2016/0090055 A1 | 3/2016 | Breed |
| 2016/0107689 A1 | 4/2016 | Lee |
| 2016/0112846 A1 | 4/2016 | Siswick |
| 2016/0114726 A1 | 4/2016 | Nagata |
| 2016/0117926 A1 | 4/2016 | Akavaram |
| 2016/0127664 A1 | 5/2016 | Bruder |
| 2016/0139244 A1 | 5/2016 | Holtman |
| 2016/0144857 A1 | 5/2016 | Ohshima |
| 2016/0153778 A1 | 6/2016 | Singh |
| 2016/0170494 A1 | 6/2016 | Bonnet |
| 2016/0185389 A1 | 6/2016 | Ishijima |
| 2016/0189435 A1 | 6/2016 | Beaurepaire |
| 2016/0207528 A1 | 7/2016 | Stefan |
| 2016/0236680 A1 | 8/2016 | Lavoie |
| 2016/0257304 A1 | 9/2016 | Lavoie |
| 2016/0272244 A1 | 9/2016 | Imai |
| 2016/0282442 A1 | 9/2016 | O'Mahony |
| 2016/0284217 A1 | 9/2016 | Lee |
| 2016/0288657 A1 | 10/2016 | Tokura |
| 2016/0304087 A1 | 10/2016 | Noh |
| 2016/0304088 A1 | 10/2016 | Barth |
| 2016/0349362 A1 | 10/2016 | Rohr |
| 2016/0321445 A1 | 11/2016 | Turgeman |
| 2016/0321926 A1 | 11/2016 | Mayer |
| 2016/0334797 A1 | 11/2016 | Ross |
| 2016/0355125 A1 | 12/2016 | Herbert |
| 2016/0358474 A1 | 12/2016 | Uppal |
| 2016/0368489 A1 | 12/2016 | Aich |
| 2016/0371607 A1 | 12/2016 | Rosen |
| 2016/0371691 A1 | 12/2016 | Kang |
| 2017/0001650 A1 | 1/2017 | Park |
| 2017/0008563 A1 | 1/2017 | Popken |
| 2017/0026198 A1 | 1/2017 | Ochiai |
| 2017/0028985 A1 | 2/2017 | Kiyokawa |
| 2017/0030722 A1 | 2/2017 | Kojo |
| 2017/0032593 A1 | 2/2017 | Patel |
| 2017/0072947 A1 | 3/2017 | Lavoie |
| 2017/0073004 A1 | 3/2017 | Shepard |
| 2017/0076603 A1 | 3/2017 | Bostick |
| 2017/0116790 A1 | 4/2017 | Kusens |
| 2017/0123423 A1 | 5/2017 | Sako |
| 2017/0129537 A1 | 5/2017 | Kim |
| 2017/0129538 A1 | 5/2017 | Stefan |
| 2017/0132482 A1 | 5/2017 | Kim |
| 2017/0144654 A1 | 5/2017 | Sham |
| 2017/0144656 A1 | 5/2017 | Kim |
| 2017/0147995 A1 | 5/2017 | Kalimi |
| 2017/0168479 A1 | 6/2017 | Dang |
| 2017/0192428 A1 | 7/2017 | Vogt |
| 2017/0200369 A1 | 7/2017 | Miller |
| 2017/0208438 A1 | 7/2017 | Dickow |
| 2017/0297385 A1 | 10/2017 | Kim |
| 2017/0301241 A1 | 10/2017 | Urhahne |
| 2017/0308075 A1 | 10/2017 | Whitaker |
| 2018/0024559 A1 | 1/2018 | Seo |
| 2018/0029591 A1 | 2/2018 | Lavoie |
| 2018/0039264 A1 | 2/2018 | Messner |
| 2018/0043884 A1 | 2/2018 | Johnson |
| 2018/0056939 A1 | 3/2018 | van Roermund |
| 2018/0194344 A1 | 7/2018 | Wang |
| 2018/0236957 A1 | 8/2018 | Min |

FOREIGN PATENT DOCUMENTS

| | | |
|---|---|---|
| CN | 103818204 A | 5/2014 |
| CN | 104485013 A | 4/2015 |
| CN | 104691544 A | 6/2015 |
| CN | 103049159 B | 7/2015 |
| CN | 105513412 A | 4/2016 |
| CN | 105588563 A | 5/2016 |
| CN | 105599703 A | 5/2016 |
| CN | 105774691 A | 7/2016 |
| CN | 106027749 A | 10/2016 |
| CN | 205719000 U | 11/2016 |
| CN | 106598630 A | 4/2017 |
| CN | 104290751 B | 1/2018 |
| DE | 3844340 A1 | 7/1990 |
| DE | 19817142 A1 | 10/1999 |
| DE | 19821163 A1 | 11/1999 |
| DE | 102005006966 A1 | 9/2005 |
| DE | 102006058213 A1 | 7/2008 |
| DE | 102009051055 A1 | 7/2010 |
| DE | 102012008858 A1 | 11/2012 |
| DE | 102011122421 A1 | 6/2013 |
| DE | 102012200725 A1 | 7/2013 |
| DE | 102013004214 A1 | 9/2013 |
| DE | 102010034129 B4 | 10/2013 |
| DE | 102012215218 A1 | 6/2014 |
| DE | 102012222972 A1 | 6/2014 |
| DE | 102013213064 A1 | 1/2015 |
| DE | 102014009077 A1 | 2/2015 |
| DE | 102013016342 A1 | 4/2015 |
| DE | 102013019771 A1 | 5/2015 |
| DE | 102013019904 A1 | 5/2015 |
| DE | 102014007915 A1 | 12/2015 |
| DE | 102014011802 A1 | 2/2016 |
| DE | 102014111570 A1 | 2/2016 |
| DE | 102014015655 A1 | 4/2016 |
| DE | 102015209976 A1 | 12/2016 |
| DE | 102015221224 A1 | 5/2017 |
| DE | 102016011916 A1 | 6/2017 |
| DE | 102016125282 A1 | 7/2017 |
| DE | 102016211021 A1 | 12/2017 |
| EP | 2289768 A2 | 3/2011 |
| EP | 2295281 A1 | 3/2011 |
| EP | 2653367 A1 | 10/2013 |
| EP | 2768718 B1 | 3/2016 |

(56) References Cited

FOREIGN PATENT DOCUMENTS

| | | | |
|---|---|---|---|
| EP | 2620351 B1 | 6/2016 | |
| EP | 2135788 B1 | 6/2017 | |
| GB | 2344481 A | 6/2000 | |
| GB | 2481324 A | 6/2011 | |
| GB | 2491720 A | 12/2012 | |
| GB | 2497836 A | 12/2012 | |
| GB | 2517835 A | 3/2015 | |
| JP | 2000293797 A | 10/2000 | |
| JP | 2004142543 A | 5/2004 | |
| JP | 2004287884 A | 10/2004 | |
| JP | 2005193742 A | 7/2005 | |
| JP | 2009090850 A | * | 4/2009 |
| JP | 2014125196 A | 7/2014 | |
| JP | 2014134082 A | 7/2014 | |
| JP | 5586450 B2 | 9/2014 | |
| JP | 5918683 B2 | 5/2016 | |
| JP | 2016119032 A | 6/2016 | |
| KR | 20090040024 A | 4/2009 | |
| KR | 20100006714 A | 1/2010 | |
| KR | 20130106005 A | 9/2013 | |
| KR | 20160039460 A | 4/2016 | |
| KR | 20160051993 A | 5/2016 | |
| WO | WO 2006/064544 A1 | 6/2006 | |
| WO | WO 2008055567 A1 | 5/2008 | |
| WO | WO 2010/006981 A1 | 1/2010 | |
| WO | WO 2011/141096 A1 | 11/2011 | |
| WO | WO 2013056959 A1 | 4/2013 | |
| WO | WO 2013/123813 A1 | 8/2013 | |
| WO | WO 2014/103492 A1 | 7/2014 | |
| WO | WO 2015/068032 A1 | 5/2015 | |
| WO | WO 2015/193058 A1 | 12/2015 | |
| WO | WO 2016/046269 A1 | 3/2016 | |
| WO | WO 2016/128200 A1 | 8/2016 | |
| WO | WO 2016/134822 A1 | 9/2016 | |
| WO | WO 2017/062448 A1 | 4/2017 | |
| WO | WO 2017/073159 A1 | 5/2017 | |
| WO | WO 2017/096307 A1 | 6/2017 | |
| WO | WO 2017/096728 A1 | 6/2017 | |
| WO | WO 2017/097942 A1 | 6/2017 | |
| WO | WO 2017/118510 A1 | 7/2017 | |
| WO | WO 2017/125514 A1 | 7/2017 | |

OTHER PUBLICATIONS

Perpendicular Parking—https://prezi.com/toqmfyxriksl/perpendicular-parking/.
Automatically Into the Parking Space—https://www.mercedes-benz.com/en/mercedes-benz/next/automation/automatically-into-the-parking-space/; Oct. 27, 2014.
Search Report dated May 21, 2018 for Great Britain Patent Application No. GB 1800277.4 (5 Pages).
Tesla Model S Owner's Manual v2018.44. Oct. 29, 2018.
Search Report dated Oct. 10, 2018 for GB Patent Application No. 1806499.8 (4 pages).
Alberto Broggi and Elena Cardarelli, Vehicle Detection for Autonomous Parking Using a Soft-Cascade ADA Boost Classifier, Jun. 8, 2014.
Al-Sherbaz, Ali et al., Hybridisation of GNSS with other wireless/sensors technologies on board smartphones to offer seamless outdoors-indoors positioning for LBS applications, Apr. 2016, 3 pages.
Bill Howard, Bosch's View of the Future Car: Truly Keyless Entry, Haptic Feedback, Smart Parking, Cybersecurity, Jan. 9, 2017, 8 Pages.
Core System Requirements Specification (SyRS), Jun. 30, 2011, Research and Innovative Technology Administration.
Daimler AG, Remote Parking Pilot, Mar. 2016 (3 Pages).
Jingbin Liu, (Parking: An Intelligent Indoor Location-Based Smartphone Parking Service, Oct. 31, 2012, 15 pages.
Land Rover develops a smartphone remote control for its SUVs, James Vincent, Jun. 18, 2015.
Search Report dated Jan. 19, 2018 for GB Patent Application No. 1711988.4 (3 pages).
Search Report dated Jul. 11, 2017 for GB Patent Application No. Enter 15/583,524, Pages (3).
Search Report dated Nov. 28, 2017, for GB Patent Application No. GB 1710916.6 (4 Pages).
Vehicle'S Orientation Measurement Method by Single-Camera Image Using Known-Shaped Planar Object, Nozomu Araki, Takao Sato, Yasuo Konishi and Hiroyuki Ishigaki, 2010.

* cited by examiner

AUTONOMOUS PARKING OF VEHICLES INPERPENDICULAR PARKING SPOTS

TECHNICAL FIELD

The present disclosure generally relates to autonomous parking and, more specifically, autonomous parking of vehicles in perpendicular parking spots.

BACKGROUND

Oftentimes, vehicles include autonomous or semi-autonomous driving systems that enable the vehicles to be driven with reduced driver input. Typically, a vehicle with an autonomous or semi-autonomous driving system includes sensors that collect information of a surrounding environment of the vehicle. In such instances, the autonomous or semi-autonomous driving system performs motive functions (e.g., steering, accelerating, braking, etc.) based on the collected information. Some driving systems utilize information collected from sensors to autonomously or semi-autonomously park (e.g., parallel park) a vehicle in an available parking spot.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for autonomous parking of vehicles in perpendicular parking spots. An example disclosed vehicle includes a front corner, a camera, and an autonomous vehicle parker. The autonomous vehicle parker is to detect, via the camera, a perpendicular parking spot and an outer boundary of the perpendicular parking spot, determine a linear parking path located within the perpendicular parking spot and based on the outer boundary, and autonomously turn into the perpendicular parking spot such that the front corner travels along the linear parking path.

An example disclosed method for autonomously parking a vehicle into a perpendicular parking spot includes detecting, via a sensor, a perpendicular parking spot and an outer boundary of the perpendicular parking spot and determining, via a processor, a linear parking path located within the perpendicular parking spot and based on the outer boundary. The example disclosed method also includes autonomously turning into the perpendicular parking spot such that a front corner of a vehicle travels along the linear parking path.

An example disclosed tangible computer readable medium including instructions which, when executed, cause a vehicle to detect, via a camera, a perpendicular parking spot and an outer boundary of the perpendicular parking spot and determine, via a processor, a linear parking path located within the perpendicular parking spot and based on the outer boundary. The instructions which, when executed, also cause the vehicle to autonomously turn into the perpendicular parking spot such that a front corner travels along the linear parking path.

BRIEF DESCRIPTION OF THE DRAWINGS

For a better understanding of the invention, reference may be made to embodiments shown in the following drawings.

The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Oftentimes, vehicles include autonomous or semi-autonomous driving systems that enable the vehicles to be driven with reduced driver input. Generally, a vehicle with such a driving system includes sensors that collect information of a surrounding environment of the vehicle. In such instances, the driving system performs motive functions (e.g., steering, accelerating, braking, etc.) based on the collected information. For example, the vehicle may include a sensor to detect nearby objects to enable the driving system to avoid such objects.

Some driving systems also utilize the collected information to autonomously or semi-autonomously park a vehicle in an available parking spot. For example, such driving systems are utilized to park a vehicle in a parallel parking spot, a diagonal parking spot, a perpendicular parking spot, etc. In some instances in which an autonomous or semi-autonomous driving system is utilized to park in a perpendicular parking spot, the driving system potentially requires a readjustment maneuver (e.g., readjusting the position of the vehicle by reversing the vehicle and subsequently returning to a forward motion) to be performed and/or an increased passing distance between the vehicle and the perpendicular parking spot to enable the vehicle to be parked in the perpendicular parking spot.

Example methods, apparatus, and computer readable media autonomously turn a vehicle into a perpendicular parking spot such that a front corner of the vehicle travels along a linear parking path within perpendicular parking spot to reduce a passing distance between the vehicle and the perpendicular parking path and/or to reduces a width of the perpendicular parking spot in which the vehicle is able to be parked in a single forward motion.

Example vehicles disclosed herein include an autonomous vehicle parker and a camera and/or a sensor. The autonomous vehicle parker autonomously parks the vehicle in a parking spot. As used herein, "autonomous parking" refers to a form of autonomous driving in which motive actions of a vehicle (e.g., steering, turning, accelerating, decelerating, etc.) are controlled by the vehicle without direct driver input to park the vehicle in a parking spot. As used herein, "autonomous driving" refers to a vehicle-maneuvering system in which motive actions of a vehicle (e.g., steering, accelerating, decelerating, etc.) are controlled by the vehicle without direct driver input. As used herein, "semi-autonomous driving" refers to a vehicle-maneuvering system in which some routine motive actions of a vehicle are controlled by the vehicle without direct driver input. As used herein, "autonomous turning" refers to a sequence of autonomous parking, autonomous driving, and/or semi-autonomous driving in which turning of a vehicle is controlled by the vehicle without direct driver input.

The autonomous vehicle parker of the examples disclosed herein detect, via the camera and/or the sensor, a perpendicular parking spot and an outer boundary of the perpendicular parking spot. As used herein, a "perpendicular parking spot" refers to a parking spot for a vehicle of which an outer boundary is perpendicular to an adjacent designated direction of travel of the vehicle.

Further, the autonomous vehicle parker determines, based on the outer boundary, a linear parking path located within the perpendicular parking spot and autonomously turns the vehicle into the perpendicular parking spot such that a front corner of the vehicle travels along the linear parking path. In some examples, the autonomous vehicle parker determines the linear parking path to be offset and parallel to the outer boundary of the perpendicular parking spot. As used herein, a "linear parking path" refers to a linear path along which a portion of a vehicle (e.g., a front corner) travels as the vehicle enters a parking spot. As used herein, a "front corner" of a vehicle refers to a portion of the vehicle at which a front surface and a side surface of the vehicle converge. For example, a vehicle includes a left, front corner and a right, front corner. In some examples, a front corner of a vehicle includes a curved surface that connects the front surface and the side surface of the vehicle. By autonomously turning the vehicle so that the front corner travels along the linear parking path in a single forward motion, the autonomous vehicle parker reduces a passing distance between the vehicle and the perpendicular parking path and/or reduces a width of the perpendicular parking spot in which the autonomous vehicle parker is able to park the vehicle. As used herein, a "passing distance" refers to a distance between a vehicle and a row of perpendicular parking spots before the vehicle turns into an available one of the perpendicular parking spots.

In some examples, the autonomous vehicle parker identifies a target parking position located within the perpendicular parking spot. In such examples, the autonomous vehicle parker determines the linear parking path based on the outer boundary of the perpendicular parking spot and the target parking position. As used herein, a "target parking position" refers to a position located at which an autonomous vehicle parker intends to park within a parking spot.

Further, when determining the linear parking path, the autonomous vehicle parker identifies a first end and a second end opposite the first end of the linear parking path. In some examples, the autonomous vehicle parker determines the first end of the linear parking path based on the target parking position and a minimum turning radius of the vehicle. For example, the autonomous vehicle parker autonomously turns the vehicle at the minimum turning radius between the first end of the linear parking path and the target parking position. As used herein, a "minimum turning radius" refers to a smallest turning radius that a vehicle is physically capable of making.

Additionally or alternatively, the autonomous vehicle parker determines the second end of the linear parking path based on the outer boundary of the perpendicular parking spot. For example, the autonomous vehicle parker determines an orientation at which the vehicle is to be positioned at the second end of the linear parking path based on the target parking position, the minimum turning radius, and a length of the linear parking path. Further, in some such examples, the autonomous vehicle parker determines whether to park in the perpendicular parking spot based on the vehicle orientation at the second end of the linear parking path, the minimum turning radius of the vehicle, and the passing distance between the vehicle and the perpendicular parking spot.

The autonomous vehicle parker of the examples disclosed herein also determines turning radii of the vehicle that cause the front corner of the vehicle to travel along the linear parking path. For example, the autonomous vehicle parker determines the turning radii based on physical characteristics of the vehicle (e.g., a distance between a front axle and a rear axle, a vehicle width, and/or a distance between the front axle and the front corner). For example, the turning radii vary to enable the front corner to travel along the linear parking path as the autonomous vehicle parker autonomously turns the vehicle into the perpendicular parking spot.

Figure 1:
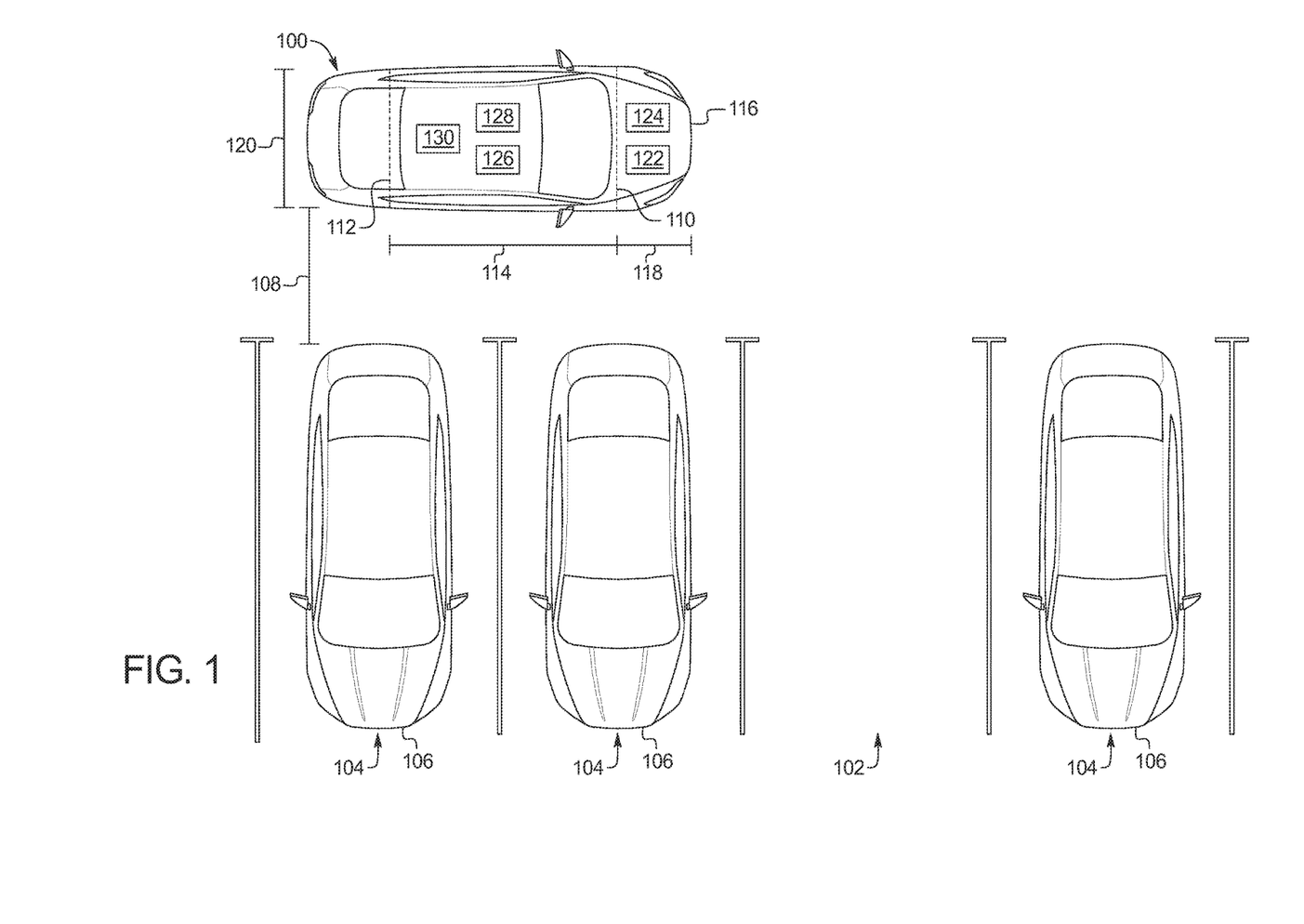
FIG. 1 illustrates an example vehicle approaching a perpendicular parking spot.

Turning to the figures, FIG. 1 illustrates an example vehicle 100 approaching a perpendicular parking spot 102 that is unoccupied. As illustrated in FIG. 1, the perpendicular parking spot 102 is positioned between other perpendicular parking spots 104 that are occupied by other respective vehicles 106.

The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be semi-autonomous (e.g., some routine motive functions controlled by the vehicle 100) or autonomous (e.g., motive functions are controlled by the vehicle 100 without direct driver input).

In the illustrated example, the vehicle 100 is spaced apart from the perpendicular parking spots 102, 104 by a passing distance 108. Further, as illustrated in FIG. 1, a front axle 110 and a rear axle 112 of the vehicle 100 are spaced apart by a distance 114 (e.g., a first distance). The front axle 110 and a front side 116 of the vehicle (e.g., including a front corner 208 of FIGS. 2-4) are spaced apart by a distance 118 (e.g., a second distance). Additionally, the vehicle 100 has a width 120. For example, the distance 114 between the front axle 110 and the rear axle 112, the distance 118 between the front axle 110 and the front corner, the width 120 of the vehicle 100, and/or a road wheel angle of the vehicle 100 defines a minimum turning radius of the vehicle 100. The road wheel angle or camber angle is an angle formed between vertical axes of wheels of the vehicle 100 and a surface on which the vehicle 100 is positioned.

As illustrated in FIG. 1, the vehicle 100 includes a camera 122, a sensor 124, a magnetometer 126, and a global positioning system (GPS) receiver 128. For example, the camera 122 is positioned toward the front side 116 of the vehicle 100 to monitor and/or collect information on the perpendicular parking spots 102, 104 that the vehicle 100 is approaching. Additionally or alternatively, the vehicle 100 utilizes the sensor 124 to monitor and/or collect information (e.g., positions, outer boundaries, etc.) on the perpendicular parking spots 102, 104. For example, the sensor 124 may include lidar sensor (e.g., a lidar sensor 516 of FIG. 5), a radar sensor (e.g., a radar sensor 518 of FIG. 5), an ultrasonic sensor (e.g., an ultrasonic sensor 520 of FIG. 5), and/or any other sensor capable of monitoring and/or collecting information on the perpendicular parking spots 102, 104. The magnetometer 126 measures a magnetic orientation of the vehicle 100 and/or a direction in which the vehicle 100 is moving. Further, the GPS receiver 128 communicates with (e.g., transmits signal to, receives signals from) a global positioning system to monitor a location of the vehicle 100.

The vehicle 100 also includes an autonomous vehicle parker 130 that autonomously parks the vehicle in unoccupied parking spots such as the perpendicular parking spot 102. For example, the autonomous vehicle parker 130 can be implemented in a full-active park-assist system in which braking, accelerating, and steering are autonomously operated and/or in a semi-active park-assist system in which steering is autonomously operated and accelerating and braking are user operated. The autonomous vehicle parker 130 autonomously parks the vehicle 100 in the perpendicular parking spot 102 in a single forward motion that reduces a passing distance (e.g., the passing distance 108) from which the vehicle 100 is able to park in the perpendicular parking spot 102 and/or reduces a width of a perpendicular parking spot in which the vehicle 100 is able to park.

Figure 2:
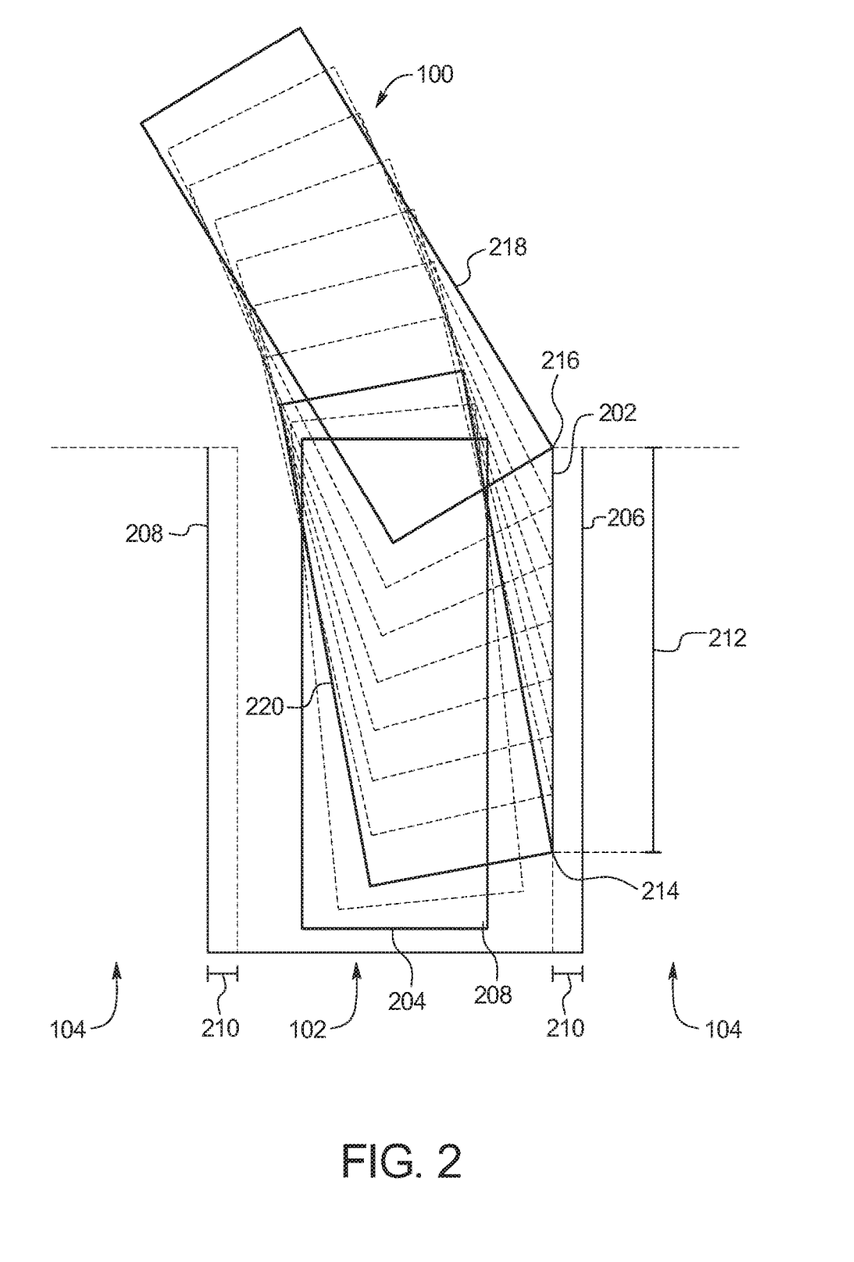
FIG. 2 depicts the vehicle of FIG. 1 traveling along a linear parking path to park in the perpendicular parking spot of FIG. 1 in accordance with the teachings herein.

FIG. 2 depicts the vehicle 100 traveling along a linear parking path 202 to park at a target parking position 204 within the perpendicular parking spot 102 in accordance with the teachings herein.

Prior to turning along the linear parking path 202, the autonomous vehicle parker 130 detects the perpendicular parking spot 102 and determines that the perpendicular parking spot 102 is unoccupied based on the information collected via the camera 122 and/or the sensor 124 of the vehicle 100. Additionally, the autonomous vehicle parker 130 detects an outer boundary 206 of the perpendicular parking spot 102 and identifies the target parking position 204 within the perpendicular parking spot 102 based on the information collected via the camera 122 and/or the sensor 124. For example, the vehicle 100 is positioned completely within the perpendicular parking spot 102 when the vehicle 100 is at the target parking position 204.

Further, based on the target parking position 204 and the outer boundary 206 of the perpendicular parking spot 102, the autonomous vehicle parker 130 determines the linear parking path 202 along which the front corner 208 of the vehicle 100 is to travel. In the illustrated example, the autonomous vehicle parker 130 determines the linear parking path 202 to be offset from and parallel to the outer boundary 206 such that the linear parking path 202 is located within the perpendicular parking spot 102. For example, the linear parking path 202 is spaced apart from the outer boundary 206 by a buffer distance 210 to deter the vehicle 100 from encroaching the other perpendicular parking spot 104 that is adjacent to the outer boundary 206.

When determining the linear parking path 202, the autonomous vehicle parker 130 determines a length 212, a first end 214, and a second end 216 opposite the first end 214 of the linear parking path 202. In some examples, the autonomous vehicle parker 130 is to autonomously turn the vehicle 100 at its minimum turning radius as the vehicle 100 travels from the first end 214 of the linear parking path 202 to the target parking position 204. In such examples, the autonomous vehicle parker 130 determines a location of the first end 214 of the linear parking path 202 based on the target parking position 204 and the minimum turning radius of the vehicle 100.

Additionally, the autonomous vehicle parker 130 determines a location of the second end 216 of the linear parking path 202 that enables the front corner 208 of the vehicle 100 to travel along the linear parking path 202 as the vehicle 100 approaches the target parking position 204. In such examples, the autonomous vehicle parker 130 determines the location of the second end 216 based on the outer boundary 206 (e.g., a length of the outer boundary 206) of the perpendicular parking spot 102, the target parking position 204, and/or the minimum turning radius of the vehicle 100. Based on the location of the first end 214 and the location of the second end, the autonomous vehicle parker 130 determines the length 212 of the linear parking path 202.

Further, the autonomous vehicle parker 130 determine orientations at which the vehicle 100 is to be positioned at respective locations along the linear parking path 202 that enable the front corner 208 of the vehicle 100 to travel along the linear parking path 202 as the vehicle 100 approaches the target parking position 204. For example, the autonomous vehicle parker 130 determines a first orientation for a first intermediate position 218 of the vehicle 100 when the front corner 208 is at the first end 214, a second orientation for a second intermediate position 220 of the vehicle 100 when the front corner 208 is at the second end 216, and orientations for other intermediate positions of the vehicle 100 between the first intermediate position 218 and the second intermediate position 220.

In some examples, the autonomous vehicle parker 130 determines the orientations at which the vehicle 100 is to be positioned along the linear parking path 202 based on the target parking position 204, the minimum turning radius of the vehicle 100, and/or the length 212 of the linear parking path 202. For example, the autonomous vehicle parker 130 determines the first orientation at the first intermediate position 218 based on the target parking position 204 and the minimum turning radius at which the vehicle 100 turns between the target parking position 204 and the first intermediate position 218. Subsequently, the autonomous vehicle parker 130 determines an orientation of an adjacent intermediate position along the linear parking path 202 based on the first orientation at the first intermediate position 218, the minimum turning radius, and a distance between the first intermediate position 218 and the adjacent intermediate position. In a similar manner, the autonomous vehicle parker 130 determines an orientation for each position along the linear parking path 202 to the second intermediate position 220. In other examples, the autonomous vehicle parker 130 queries a lookup table for the orientations at which the vehicle 100 is to be positioned along the linear parking path 202. In such examples, the autonomous vehicle parker 130 queries the lookup table based on the target parking position 204, the minimum turning radius of the vehicle 100, and/or the length 212 of the linear parking path 202 determined by the autonomous vehicle parker 130.

Based on the orientations at which the vehicle 100 is to be positioned along the linear parking path 202, the autonomous vehicle parker 130 determines turning radii of the vehicle 100 that enable the front corner 208 of the vehicle 100 to travel along the linear parking path 202. For example, the autonomous vehicle parker 130 determines the turning radii of the vehicle 100 that enable the vehicle 100 to transition from one orientation at one position along the linear parking path 202 to another orientation at another position along the linear parking path 202. The autonomous vehicle parker 130 may determine the turning radius associated with a particular position along the linear parking path 202 based on physical characteristics of the vehicle 100 such as the distance 114 between the front axle 110 and the rear axle 112, the width 120 of the vehicle 100, and/or the distance 118 between the front axle 110 and the front side 116 (e.g., the front corner 208). For example, the turning radius of the vehicle 100 varies to enable the front corner 208 to travel along the linear parking path 202 as the autonomous vehicle parker 130 autonomously turns the vehicle 100 into the perpendicular parking spot 102.

Further, the autonomous vehicle parker 130 also determines whether the autonomous vehicle parker 130 is able to park the vehicle 100 at the target parking position 204 within the perpendicular parking spot 102 in a single forward motion. For example, the autonomous vehicle parker 130 determines whether the passing distance 108 of the vehicle 100 enables the vehicle 100 to reach the linear parking path 202 at an orientation relative to the linear parking path 202 that enables the front corner 208 to travel along the linear parking path 202 to the target parking position 204. In such examples, the autonomous vehicle parker 130 determines whether the vehicle 100 is able to park in the perpendicular parking spot 102 based on the passing distance 108 the minimum turning radius of the vehicle 100, and/or the orientation at which the vehicle 100 is to be positioned at the second end 216 of the linear parking path 202. In response to determining that the autonomous vehicle parker 130 is able to park the vehicle 100 in a single forward motion, the autonomous vehicle parker 130 autonomously turns the vehicle 100 into the perpendicular parking spot 102 and toward the target parking position so that a front corner 208 (e.g., a front, left corner in FIG. 2) of the vehicle 100 travels along the linear parking path 202.

Figure 3:
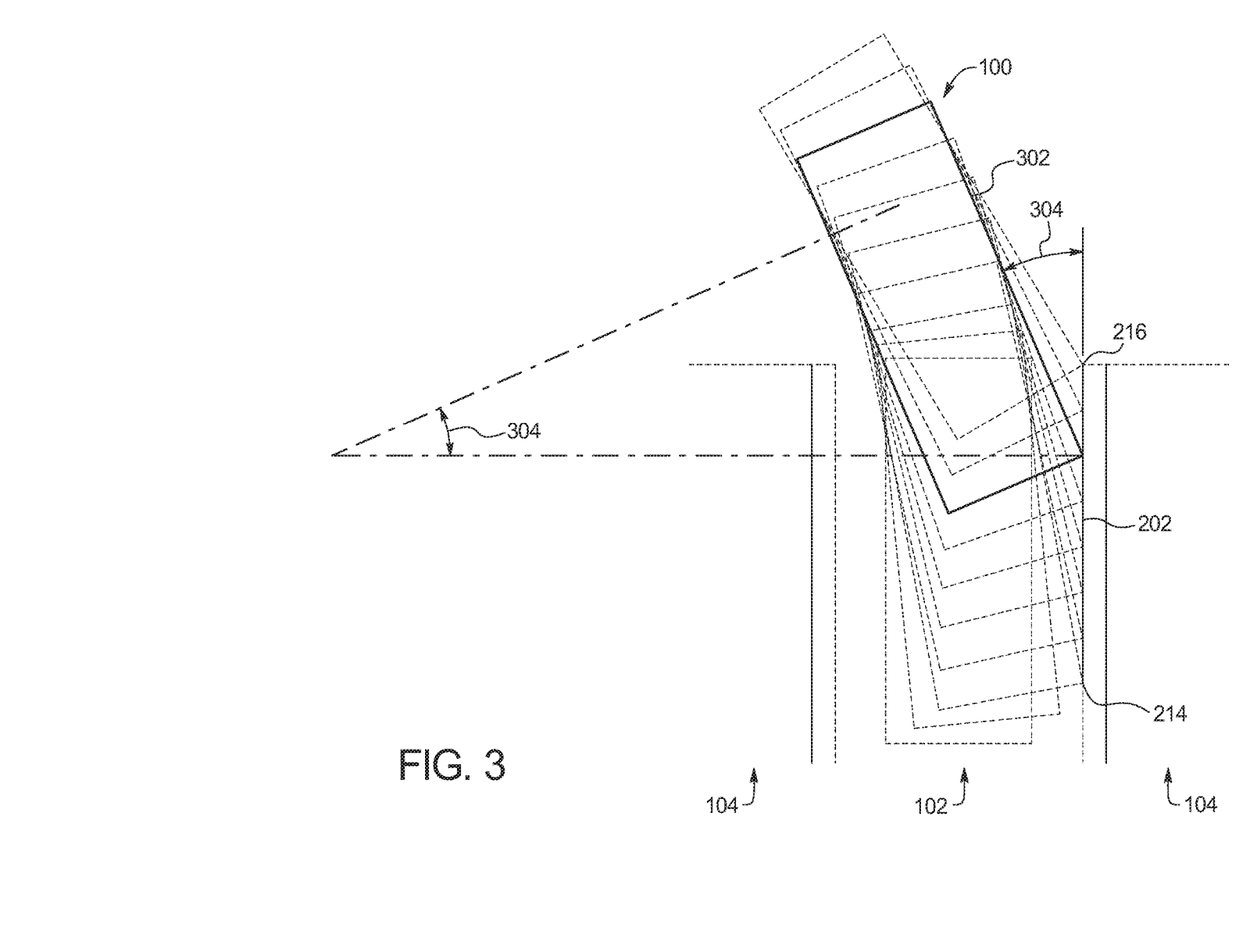
FIG. 3 also depicts the vehicle of FIG. 1 traveling along the linear parking path of FIG. 2.

FIG. 3 also depicts the vehicle 100 traveling along the linear parking path 202 and into the perpendicular parking spot 102 located between the other perpendicular parking spots 104. In FIG. 3, the vehicle 100 is positioned at a third intermediate position 302 along the linear parking path 202 that is between the first intermediate position 218 at the first end 214 and the second intermediate position 220 at the second end 216. At the third intermediate position 302, the vehicle 100 is oriented at an angle 304 relative to the linear parking path 202.

Further, the autonomous vehicle parker 130 utilizes Equation 1 provided below to determine the turning radius of the vehicle 100 at the third intermediate position 302 and the turning radii of the vehicle 100 at other positions (e.g., the first intermediate position 218, the second intermediate position 220) that enables the front corner 208 of the vehicle 100 to travel along the linear parking path 202 as the vehicle enters the perpendicular parking spot 102.

$$R(x) = \frac{WB + L_f - \tan\omega(x) \cdot \frac{VW}{2}}{\tan w(x)} \quad \text{Equation 1}$$

In Equation 1 provided above, x represents a position along the linear parking path 202 (e.g., the first intermediate position 218, the second intermediate position 220, the third intermediate position 302), R represents the turning radius at which the vehicle 100 is to turn at x, WB represents the distance 114 between the front axle 110 and the rear axle 112, $L_f$ represents the distance 118 between the front axle 110 and the front side 116, VW represents the width 120 of the vehicle 100, and ω represents an orientation of the vehicle relative to the linear parking path 202 at x (e.g., the angle 304 at the third intermediate position 302). For example, the autonomous vehicle parker 130 utilizes Equation 1 to determine the turning radius of the vehicle 100 at each position along the linear parking path 202 that enables the vehicle 100 to park within the perpendicular parking spot 102 in single forward motion. In other examples, Equation 1 is utilized to generate data in a lookup table that the autonomous vehicle parker 130 queries to determine the turning radius of the vehicle 100 at each position along the linear parking path 202.

Figure 4:
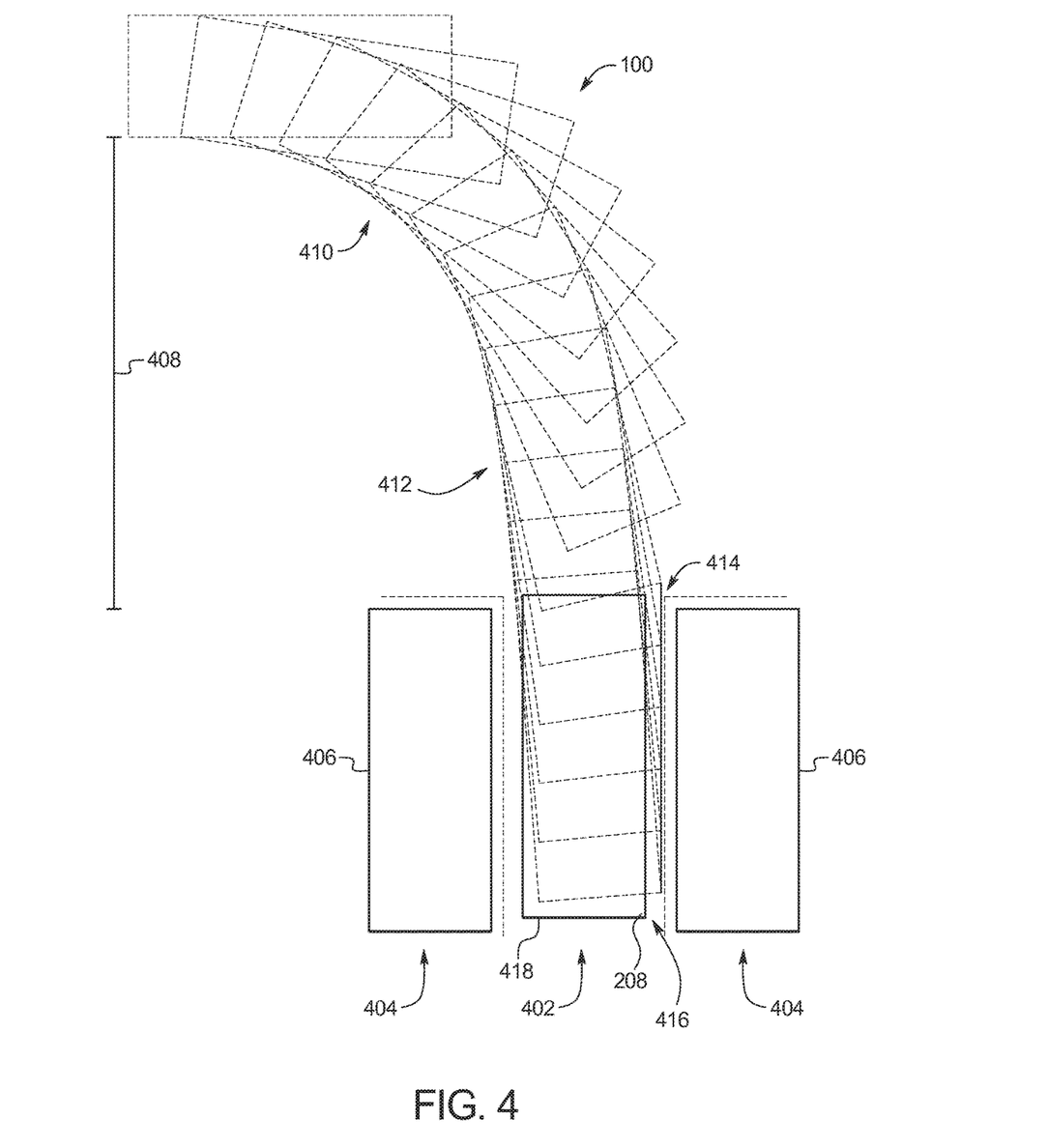
FIG. 4 depicts the vehicle of FIG. 1 traveling along a linear parking path to park in another perpendicular parking in accordance with the teachings herein.

FIG. 4 depicts the vehicle 100 traveling along another example linear parking path 400 to park in another perpendicular parking spot 402 in accordance with the teachings herein. As illustrated in FIG. 4, the perpendicular parking spot 402 is positioned between other perpendicular parking spots occupied by other respective vehicles 404. Further, the perpendicular parking spot 402 of FIG. 4 has a width that is less than that of the perpendicular parking spot 102 of FIGS. 1-3. By determining and autonomously turning the vehicle 100 so that the front corner 208 travels along a linear parking path (e.g., the linear parking path 400), the autonomous vehicle parker 130 is capable of reducing a width of a perpendicular parking spot (e.g., the perpendicular parking spot 402) in which the vehicle 100 is able to park in a single forward motion.

To park in the perpendicular parking spot 402, the vehicle 100 initially is positioned at a passing distance 408. Subsequently, the autonomous vehicle parker 130 autonomously turns the vehicle 100 to travel along a first parking path portion 410. In the illustrated example, the autonomous vehicle parker 130 autonomously turns the vehicle 100 at the minimum turning radius of the vehicle 100 to reduce the passing distance 408 from which the vehicle 100 is able to park in the perpendicular parking spot 402 in a single forward motion. The autonomous vehicle parker 130 then autonomously turns the vehicle 100 to travel along a second parking path portion 412. During the second parking path portion 412, the vehicle 100 the turning radius at which the vehicle 100 turns may vary over time and/or be greater than the minimum turning radius of the vehicle. As the vehicle 100 reaches the perpendicular parking spot 402, the autonomous vehicle parker 130 autonomously turns the vehicle 100 so that the front corner 208 of the vehicle 100 travels along the linear parking path 400. By traveling along the linear parking path 400, the autonomous vehicle parker 130 reduces the passing distance 408 from which the vehicle 100 is able to park in the perpendicular parking spot 402 in a single forward motion. Further, after the vehicle 100 travels along the linear parking path 400, the autonomous vehicle parker 130 autonomously turns the vehicle 100 to travel along a fourth parking path portion 416 to arrive at a target parking position 418. For example, the autonomous vehicle parker 130 autonomously turns the vehicle 100 at the minimum turning radius of the vehicle along the fourth parking path portion 416.

Figure 5:
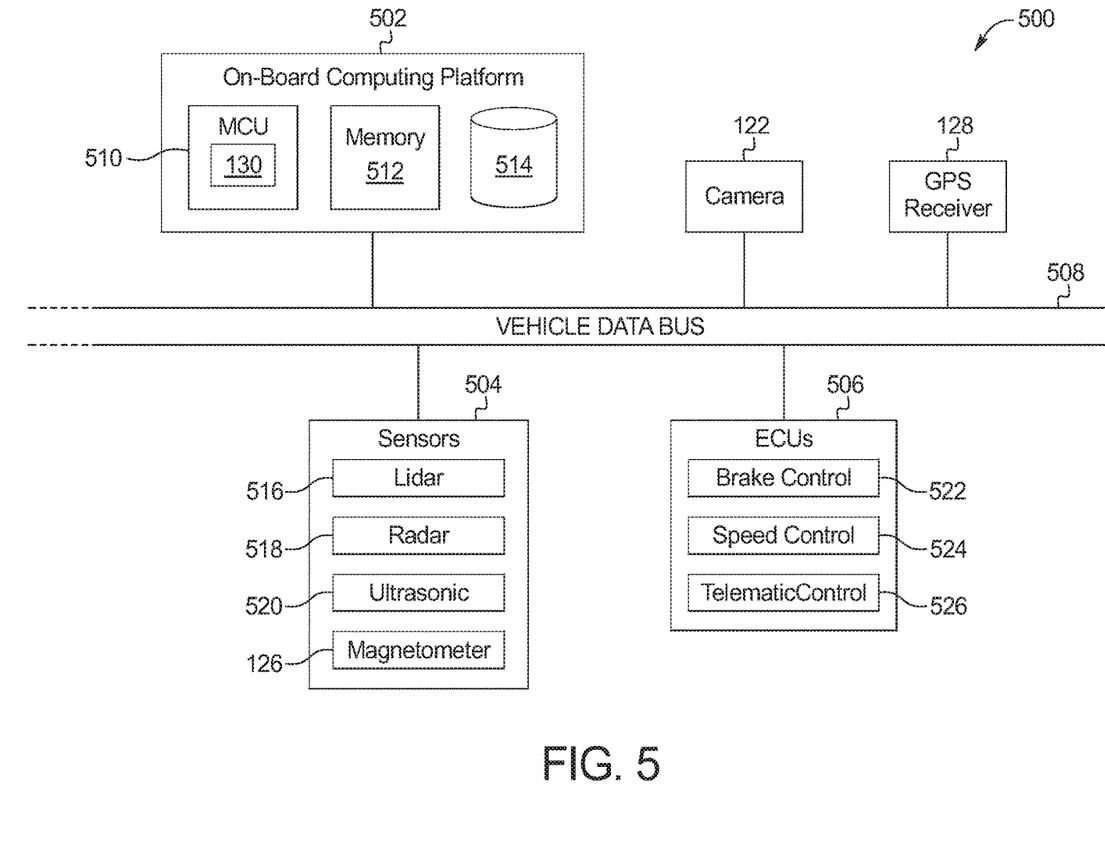
FIG. 5 is a block diagram of electronic components of the vehicle of FIG. 1.

FIG. 5 is a block diagram of electronic components 500 of the vehicle 100. As illustrated in FIG. 5, the electronic components 500 include an on-board computing platform 502, the camera 122, the GPS receiver 128, sensors 504, electronic control units (ECUs) 506, and a vehicle data bus 508.

The on-board computing platform 502 includes a microcontroller unit, controller or processor 510, memory 512, and a database 514. In some examples, the processor 510 of the on-board computing platform 502 is structured to include the autonomous vehicle parker 130. Alternatively, in some examples, the autonomous vehicle parker 130 is incorporated into another electronic control unit (ECU) with its own processor 510 and memory 512. The processor 510 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 512 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 512 includes multiple kinds of memory, particularly volatile memory and non-volatile memory.

The memory 512 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 512, the computer readable medium, and/or within the processor 510 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

In some examples, the autonomous vehicle parker 130 and/or the processor 510 calculates orientations at which the vehicle 100 is to be positioned at respective locations as the vehicle 100 approaches the target parking position 204 (e.g., as the front corner 208 of the vehicle 100 travels along the linear parking path 202). Additionally or alternatively, the autonomous vehicle parker 130 and/or the processor 510 queries a lookup table of the database 514 to identify orientations at which the vehicle 100 is to be positioned at respective locations as the vehicle 100 approaches the target parking position 204. For example, the lookup table of the database 514 may enable the autonomous vehicle parker 130 and/or the processor 510 to identify an orientation of the vehicle 100 at a particular location along the linear parking path 202 based on the length 212 of the linear parking path 202, the target parking position 204 within the perpendicular parking spot 102, and the minimum turning radius of the vehicle 100.

The sensors 504 are arranged in and around the vehicle 100 to monitor properties of the vehicle 100 and/or an environment in which the vehicle 100 is located. One or more of the sensors 504 may be mounted to measure properties around an exterior of the vehicle 100. Additionally or alternatively, one or more of the sensors 504 may be mounted inside a cabin of the vehicle 100 or in a body of the vehicle 100 (e.g., an engine compartment, wheel wells, etc.) to measure properties in an interior of the vehicle 100. For example, the sensors 504 include accelerometers, odometers, tachometers, pitch and yaw sensors, wheel speed sensors, microphones, tire pressure sensors, biometric sensors and/or sensors of any other suitable type.

In the illustrated example, the sensors 504 include a lidar sensor 516, a radar sensor 518, an ultrasonic sensor 520, and the magnetometer 126. For example, the sensor 124 of the vehicle 100 that may be utilized to detect the perpendicular parking spot 102, the outer boundary 206 of the perpendicular parking spot 102, and/or the target parking position 204 within the perpendicular parking spot 102 includes the lidar sensor 516, the radar sensor 518, and/or the ultrasonic sensor 520. The lidar sensor 516 detects and locates an object (e.g., the perpendicular parking spot 102) via lasers, the radar sensor 518 detects and locates the object via radio waves, and the ultrasonic sensor 520 detects and locates the object via ultrasound waves. Further, the magnetometer 126 measures the magnetic orientation of the vehicle 100 as the turns into the perpendicular parking spot 102.

The ECUs 506 monitor and control the subsystems of the vehicle 100. For example, the ECUs 506 are discrete sets of electronics that include their own circuit(s) (e.g., integrated circuits, microprocessors, memory, storage, etc.) and firmware, sensors, actuators, and/or mounting hardware. The ECUs 506 communicate and exchange information via a vehicle data bus (e.g., the vehicle data bus 508). Additionally, the ECUs 506 may communicate properties (e.g., status of the ECUs 506, sensor readings, control state, error and diagnostic codes, etc.) to and/or receive requests from each other. For example, the vehicle 100 may have seventy or more of the ECUs 506 that are positioned in various locations around the vehicle 100 and are communicatively coupled by the vehicle data bus 508. In the illustrated example, the ECUs 506 include a brake control module 522, a speed control unit 524, and a telematic control unit 526. For example, the brake control module 522 autonomously operate brakes of the vehicle 100, and the speed control unit 524 autonomously controls a speed at which the vehicle 100 travels. In some examples, the brake control module 522 and the speed control unit 524 receive signals from the processor 510 of the on-board computing platform 502 to control the brakes and the speed, respectively, of the vehicle 100. Further, the telematic control unit 526 controls tracking of the vehicle 100, for example, utilizing data received by the GPS receiver 128 of the vehicle 100.

The vehicle data bus 508 communicatively couples the camera 122, the GPS receiver 128, the on-board computing platform 502, the sensors 504, and the ECUs 506. In some examples, the vehicle data bus 508 includes one or more data buses. The vehicle data bus 508 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™bus protocol IEEE 802.3 (2002 onwards), etc.

Figure 6:
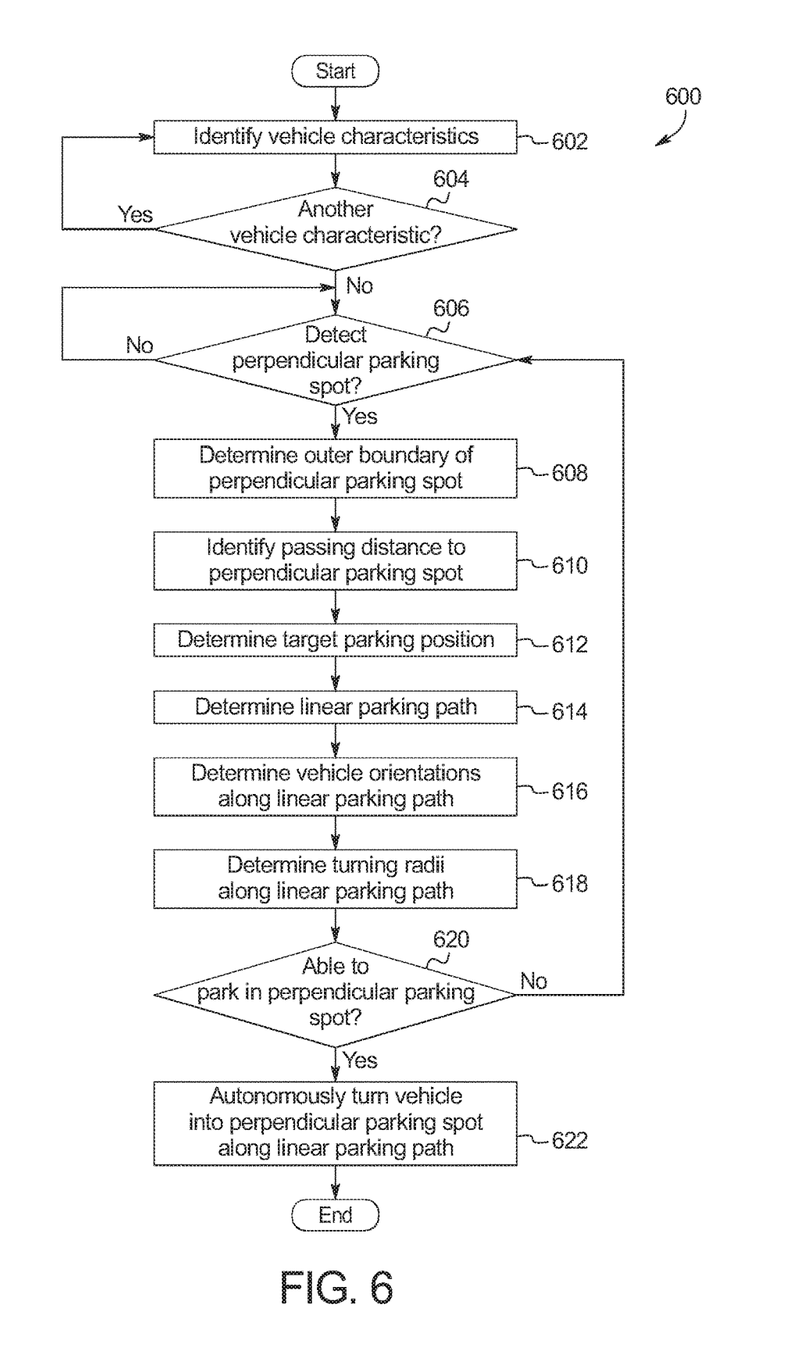
FIG. 6 is a flowchart of an example method for autonomously parking a vehicle in a perpendicular parking spot by traveling along a linear path in accordance with the teachings herein.

FIG. 6 is a flowchart of an example method 600 to autonomously parking a vehicle in a perpendicular parking spot by traveling along a linear path. The flowchart of FIG. 6 is representative of machine readable instructions that are stored in memory (such as the memory 512 of FIG. 5) and include one or more programs which, when executed by a processor (such as the processor 510 of FIG. 5), cause the vehicle 100 to implement the example autonomous vehicle parker 130 of FIGS. 1 and 5. While the example program is described with reference to the flowchart illustrated in FIG. 6, many other methods of implementing the example autonomous vehicle parker 130 may alternatively be used. For example, the order of execution of the blocks may be rearranged, changed, eliminated, and/or combined to perform the method 600. Further, because the method 600 is disclosed in connection with the components of FIGS. 1-5, some functions of those components will not be described in detail below.

Initially, at block 602, the autonomous vehicle parker 130 determines a characteristic of the vehicle 100. For example, the autonomous vehicle parker 130 determines the distance 114 between the front axle 110 and the rear axle 112. At block 604, the autonomous vehicle parker 130 identifies whether there is another characteristic of the vehicle 100 to determine. In response to determining that there is another characteristic to determine, the autonomous vehicle parker 130 repeats blocks 602, 604 until no other characteristics are identified. For example, the autonomous vehicle parker 130 repeats blocks 602, 604 to determine the distance 118 between the front axle 110 and the front side 116 (e.g., the front corner 208), the width 120 of the vehicle 100 and/or the minimum turning radius.

At block 606, the autonomous vehicle parker 130 determines, via the camera 122 and/or the sensor 124, whether an available or open perpendicular parking spot is detected. In response to the autonomous vehicle parker 130 not detecting an available perpendicular parking spot, block 606 is repeated. In response to the autonomous vehicle parker 130 detecting an available perpendicular parking spot (e.g., the perpendicular parking spot 102), the method 600 proceeds to block 608 at which the autonomous vehicle parker 130 determines the outer boundary 206 of the perpendicular parking spot 102 via the camera 122 and/or the sensor 124. At block 610, the autonomous vehicle parker 130 identifies, via the camera 122 and/or the sensor 124, the passing distance 108 of the vehicle 100 to the perpendicular parking spot 102. Further, at block 612, the autonomous vehicle parker 130 determines the target parking position 204 within the perpendicular parking spot 102 at which the vehicle 100 is to be parked.

At block 614, the autonomous vehicle parker 130 determines the linear parking path 202 along which the front corner 208 of the vehicle 100 is to travel as the vehicle 100 approaches the target parking position 204 in a single forward motion. For example, the autonomous vehicle parker 130 determines the linear parking path 202 based on the outer boundary 206 of the perpendicular parking position 102 and the target parking position 204 locate within the perpendicular parking position 102. At block 616, the autonomous vehicle parker 130 determines orientations at which the vehicle 100 is to be positioned along the linear parking path 202. For example, autonomous vehicle parker 130 determines an orientation of the vehicle 100 at a corresponding position based on the target parking position 204, the minimum turning radius of the vehicle 100, and/or the length 212 of the linear parking path 202.

At block 618, the autonomous vehicle parker 130 determines turning radii that enable the front corner 208 of the vehicle 100 to travel along the linear parking path 202. That is, the turning radii determined by the autonomous vehicle parker 130 enable the vehicle 100 to transition from one orientation at one position along the linear parking path 202 to another orientation at another position along the linear parking path 202 as the front corner 208 travels along the linear parking path 202. For example the autonomous vehicle parker 130 determines the turning radii based on the target parking position 204, the outer boundary 206 of the perpendicular parking spot 102, and/or characteristics of the vehicle 100. Additionally or alternatively, the autonomous vehicle parker 130 determines the turning radii by querying the lookup table of the database 514 based on the target parking position 204, the outer boundary 206 of the perpendicular parking spot 102, and/or characteristics of the vehicle 100.

At block 620, the autonomous vehicle parker 130 determines whether the vehicle 100 is able to be parked in the perpendicular parking spot 102. For example, the autonomous vehicle parker 130 determines whether the vehicle 100 is able to approach the linear parking path 202 in such a manner that enables the front corner 208 of the vehicle 100 to travel along linear parking path 202. In response to the autonomous vehicle parker 130 determining that the vehicle 100 is unable to be parked in the perpendicular parking spot 102, the method 600 returns to block 606. In response to determining that the vehicle 100 is able to be parked in the perpendicular parking spot 102, the autonomous vehicle parker 130 autonomously turns the vehicle 100 into the perpendicular parking spot 102 such that the front corner 208 travels along the linear parking path 202 and the vehicle 100 reaches the target parking position 204.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:
1. A vehicle comprising:
a front corner;
a camera; and
an autonomous vehicle parker to:
  detect, via the camera, a perpendicular parking spot and an outer boundary of the perpendicular parking spot;
  determine a linear parking path located within the perpendicular parking spot and based on the outer boundary, wherein the linear parking path extends in a first direction and is spaced apart from the outer boundary in a second direction crossing the first direction; and
  autonomously turn into the perpendicular parking spot such that the front corner travels along the linear parking path.

2. The vehicle of claim 1, wherein the autonomous vehicle parker identifies a target parking position located within the perpendicular parking spot and determines the linear parking path further based on the target parking position.

3. The vehicle of claim 1, wherein the autonomous vehicle parker determines the linear parking path to be parallel to the outer boundary of the perpendicular parking spot.

4. The vehicle of claim 1, wherein the autonomous vehicle parker identifies a first end and a second end opposite the first end of the linear parking path.

5. The vehicle of claim 4, wherein the autonomous vehicle parker determines the first end based on a target parking position and a minimum turning radius.

6. The vehicle of claim 5, wherein the autonomous vehicle parker autonomously turns at the minimum turning radius between the first end of the linear parking path and the target parking position.

7. The vehicle of claim 4, wherein the autonomous vehicle parker determines the second end based on the outer boundary of the perpendicular parking spot.

8. The vehicle of claim 7, wherein the autonomous vehicle parker determines a vehicle orientation at which the vehicle is to be positioned at the second end of the linear parking path based on a target parking position, a minimum turning radius, and a length of the linear parking path.

9. The vehicle of claim 8, wherein the autonomous vehicle parker determines whether to park in the perpendicular parking spot based on a passing distance to the perpendicular parking spot, the vehicle orientation at the second end of the linear parking path, and the minimum turning radius.

10. The vehicle of claim 1, wherein the autonomous vehicle parker determines turning radii that cause the front corner to travel along the linear parking path based on a first distance between a front axle and a rear axle, a vehicle width, and a second distance between the front axle and the front corner.

11. The vehicle of claim 10, wherein the turning radii vary as the autonomous vehicle parker autonomously turns along the linear parking path.

12. The vehicle of claim 1, wherein the autonomous vehicle parker autonomously turns along the linear parking path in a single forward motion to at least one of reduce a passing distance between the vehicle and the linear parking path and reduce a width of the perpendicular parking spot in which the autonomous vehicle parker is able to park.

13. The vehicle of claim 1, including at least one of a radar sensor, a lidar sensor, and an ultrasonic sensor to further detect the perpendicular parking spot and the outer boundary of the perpendicular parking spot.

14. A method for autonomously parking a vehicle into a perpendicular parking spot, the method comprising:
   detecting, via a sensor, the perpendicular parking spot and an outer boundary of the perpendicular parking spot;
   determining, via a processor, a linear parking path located within the perpendicular parking spot and based on the outer boundary, wherein the linear parking path extends in a first direction and is spaced apart from the outer boundary in a second direction crossing the first direction; and
   autonomously turning into the perpendicular parking spot such that a front corner of the vehicle travels along the linear parking path.

15. The method of claim 14, further including identifying a target parking position located within the perpendicular parking spot, wherein determining the linear parking path is further based on the target parking position.

16. The method of claim 14, further including identifying a first end and a second end opposite the first end of the linear parking path based on the outer boundary of the perpendicular parking spot, a target parking position, and a minimum turning radius of the vehicle.

17. The method of claim 16, further including autonomously turning at the minimum turning radius between the first end of the linear parking path and the target parking position.

18. The method of claim 16, further including:
   determining a vehicle orientation at which the vehicle is to be positioned at the second end of the linear parking path based on a target parking position, the minimum turning radius, and a length of the linear parking path; and
   determining whether to park in the perpendicular parking spot based on a passing distance between the vehicle and the perpendicular parking spot, the vehicle orientation of the vehicle at the second end of the linear parking path, and the minimum turning radius of the vehicle.

19. The method of claim 14, further including determining turning radii that cause the front corner to travel along the linear parking path based on a first distance between a front axle and a rear axle of the vehicle, a vehicle width of the vehicle, and a second distance between the front axle and the front corner of the vehicle.

20. A tangible computer readable medium including instructions which, when executed, cause a vehicle to:
   detect, via a camera, a perpendicular parking spot and an outer boundary of the perpendicular parking spot;
   determine, via a processor, a linear parking path located within the perpendicular parking spot and based on the outer boundary, wherein the linear parking path extends in a first direction and is spaced apart from the outer boundary in a second direction crossing the first direction; and
   autonomously turn into the perpendicular parking spot such that a front corner travels along the linear parking path.

* * * * *